Nov. 22, 1932.  A. HOSSFELD  1,888,668
DRILLING MACHINE
Filed Dec. 4, 1931  2 Sheets-Sheet 1
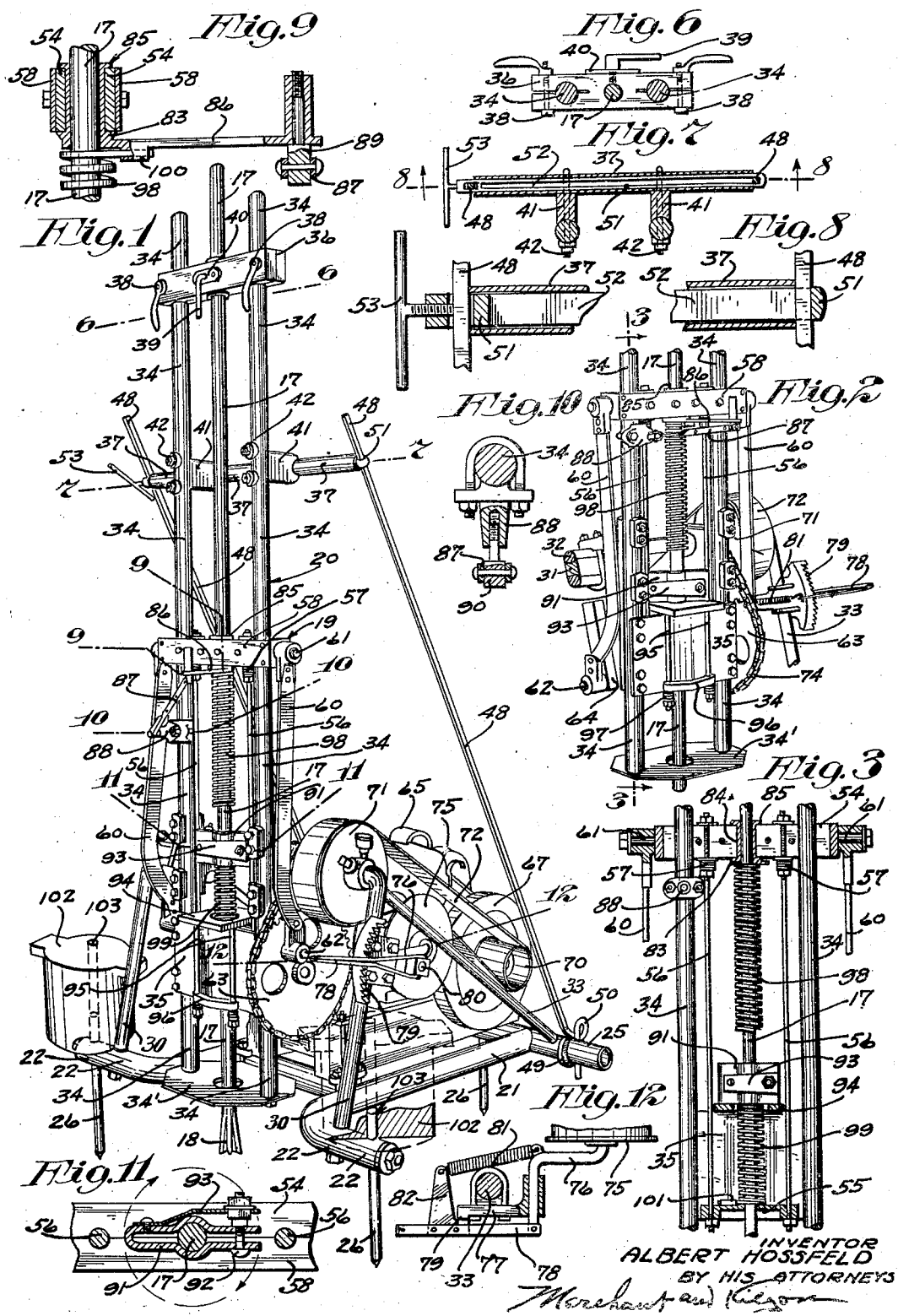
INVENTOR
ALBERT HOSSFELD
BY HIS ATTORNEYS Nov. 22, 1932.　　　A. HOSSFELD　　　1,888,668
DRILLING MACHINE
Filed Dec. 4, 1931　　2 Sheets-Sheet 2
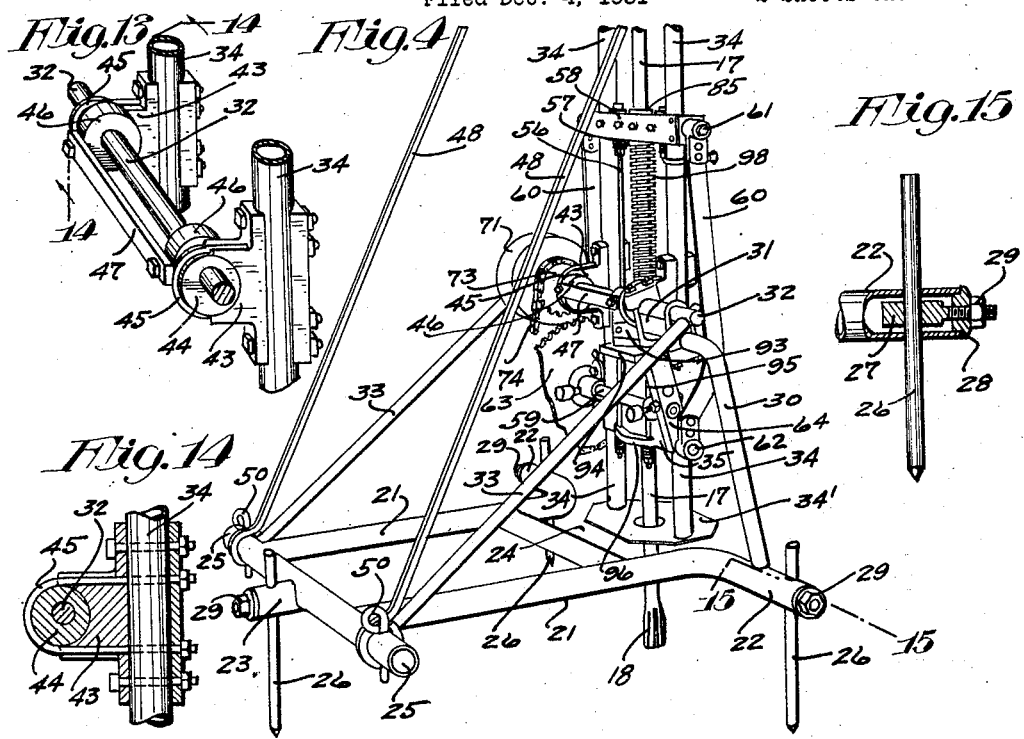
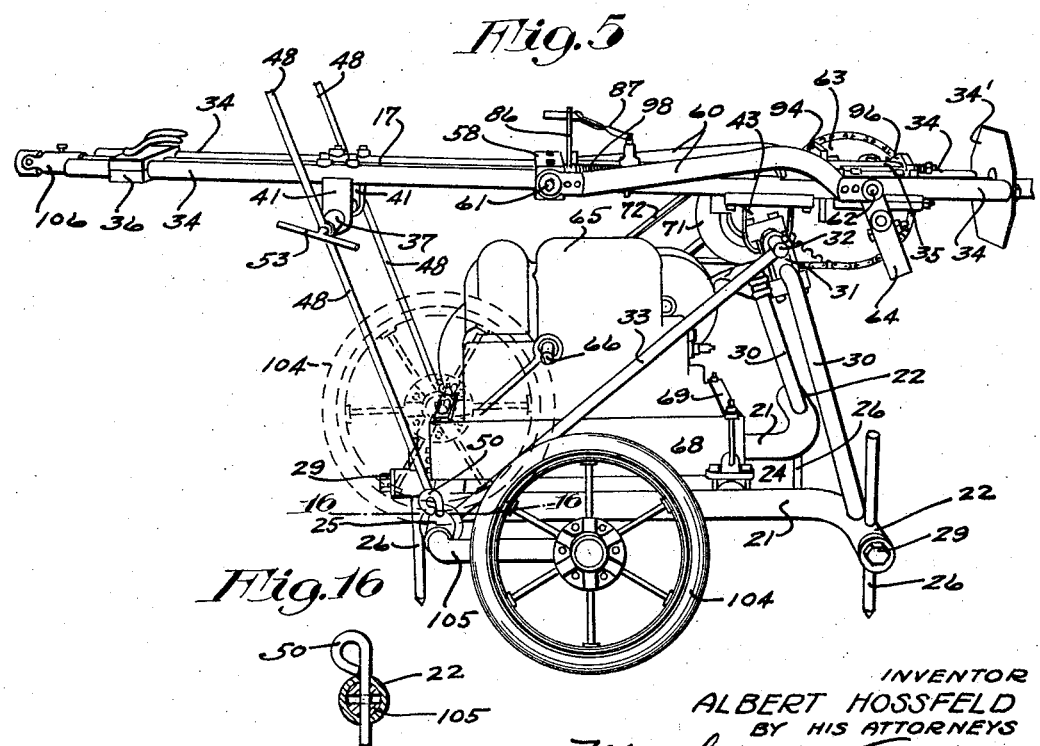
INVENTOR
ALBERT HOSSFELD
BY HIS ATTORNEYS
Merchant and Kilgore Patented Nov. 22, 1932

1,888,668

UNITED STATES PATENT OFFICE

ALBERT HOSSFELD, OF WINONA, MINNESOTA

DRILLING MACHINE

Application filed December 4, 1931. Serial No. 578,883.

My present invention relates to a drilling machine of the type disclosed and broadly claimed in my United States patent, "Drilling machines," Number 1,127,003 issued February 2, 1915.

This invention provides a self-contained unit which includes a motor and transmission mechanism for reciprocating a sliding carriage on which a drill or other tool is independently reciprocated in respect thereto. This unit is designed to withstand the severe shocks, strains and vibrations common to such machines and at the same time be light enough in weight to be easily carried or transported and very quickly set-up for each hole to be drilled or operation to be performed and adjusted for such work to operate the tool in either a vertical or horizontal position or at any angle between these two positions. The design of the machine also permits it to be positioned so that its cutting tool may be operated very close to a wall, ledge or the like.

The invention further provides novel means for mounting the drill for compound reciprocatory and rotary movements, whereby it is relieved from all side pressure and other strains caused by vibrations, etc.

Further objects of this invention are to overcome certain serious objections in the construction of the machine shown in the patent heretofore referred to, to wit: The mounting of the carriage on the frame, the mounting of the drill on the carriage, and the application of power for reciprocating the carriage which is off-center or, in other words, is at a point radially offset from the axis of the drill and midway between the bearings on the carriage for the drill. This mounting of the carriage and the drill and the off-center application of power produces angular movements to the carriage during its reciprocatory movement in respect to the longitudinal axis of the drill, that cause a side thrust pressure of the carriage against the drill at diametrically opposite and longitudinally spaced points. This lateral pressure on the drill by the carriage produces a gripping action that prevents free and easy rotation of the drill and requires considerable power to overcome the same.

Furthermore, the off-center application of power to the carriage produced a whipping action on the outer end portion of the drill, during its reciprocatory movement, that make it extremely difficult to keep the machine standing steady even by the use of heavy retaining weights.

Another objection to my prior machine was that the lower guide for the carriage, in which the drill worked, was necessarily close to the work and constantly within range of the splash from the cuttings of the rock with a result that it was difficult to keep the bearing properly lubricated and the side thrust of this bearing on the drill caused rapid wear.

In my present invention the carriage and drill are mounted for independent reciprocatory movement in the same plane and the application of power for reciprocating the carriage is evenly distributed on the carriage so that it is in a direct line with the movement of the carriage, thus eliminating all side pressure on the drill and the carriage on its guides.

The carriage in the present application further provides novel means for mounting the same on its guides and in mounting the drill on the carriage at its tool-equipped end, whereby the drill is relieved from all side thrust from the carriage, even to that of assisting in carrying the weight of the drill when operated in either a horizontal or an oblique position, or other side strains caused by vibrations when it is working in a vertical position. This mounting of the tool-equipped end of the drill does not require a lubricant and reduces wear to a minimum.

Other objects of the invention will appear in the following description.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the improved drilling machine adjusted to drill a vertical hole and with the drill retracted;

Fig. 2 is a fragmentary perspective view looking at the machine from the opposite side thereof from that shown in Fig. 1 and with the drill projected;

Fig. 3 is a view partly in elevation and partly in vertical section taken on the line 3—3 of Fig. 2;

Fig. 4 is a perspective view of the drilling machine with some parts removed and other parts broken away and looking at the machine from the back thereof with the parts positioned as shown in Figs. 2 and 3;

Fig. 5 is a perspective view of the machine principally in diagram and looking at the same from the right side thereof and adjusted for transportation or for drilling a horizontal hole when the wheels are adjusted as shown by broken lines;

Fig. 6 is a view partly in bottom plan and partly in horizontal section taken on the line 6—6 of Fig. 1;

Fig. 7 is a view partly in plan and partly in horizontal section taken on the line 7—7 of Fig. 1;

Fig. 8 is a fragmentary detail view with some parts sectioned on the line 8—8 of Fig. 7, on an enlarged scale;

Fig. 9 is a fragmentary detail view with some parts sectioned on the line 9—9 of Fig. 1, on an enlarged scale;

Fig. 10 is a detail view with some parts sectioned on the line 10—10 of Fig. 1, on an enlarged scale;

Fig. 11 is a detail view with some parts sectioned on the line 11—11 of Fig. 1, on an enlarged scale;

Fig. 12 is a fragmentary detail view with some parts sectioned on the line 12—12 of Fig. 1, on an enlarged scale;

Fig. 13 is a perspective view of the chain tightener for the crank-shaft drive;

Fig. 14 is a detail view with some parts sectioned on the line 14—14 of Fig. 13;

Fig. 15 is a detail view with some parts sectioned on the line 15—15 of Fig. 4, on an enlarged scale; and Fig. 16 is a detail view with some parts sectioned on the line 16—16 of Fig. 5.

The numeral 17 indicates a drill the body of which is a long round steel bar having on its inner end a cutter 18. This drill 17 is mounted on a reciprocatory carriage 19 for compound endwise reciprocatory movement and rotary movement about its longitudinal axis. The carriage 19 is mounted on a tilting frame 20 for sliding movement longitudinally thereof and said tilting frame, in turn, is mounted on a main or stationary horizontal frame 21.

Main frame

The main frame 21 is in the form of a rectangle and comprises a pair of longitudinal side members and front and rear end members, all of which are rigidly connected by welding or otherwise. On the frame 21 at the front thereof is a pair of axially aligned supporting arms 22 and at the rear thereof is a single supporting arm 23. All of the members of the frame 21 and the arm 23 are tubular which make a strong rigid structure that is of relatively light-weight. The arms 22, which are parallel to the end members of the frame 21, are formed by the end portions of the side members of said frame. In forming the arms 22 the side members of the frame 21 are extended in parallel arrangement forward of the front end member of said frame to form a recess 24, for a purpose that will presently appear, and then laterally outward of the frame 21 to form said arms.

The arm 23 is welded or otherwise rigidly secured to the rear end member of the frame 21, at the longitudinal center thereof, and projects rearward therefrom in the plane of said frame. The end portions of the rear end member of the frame 21 are extended outward of the frame 21 and afford a pair of arms 25.

Each of the arms 22 and the arm 23 is provided with a ground-engaging leg 26 in the form of a round bar of iron pointed at its lower end. These legs 26 extend through vertical holes in the arms 22 and 23 with freedom for endwise sliding movement for adjustment to support the main frame 21 with a three-point contact. Eye bolts 27 are provided for rigidly securing the legs 26, by friction, to the arms 22 and 23 in different longitudinal adjustments. The legs 26 extend through the eyes in the bolts 27 and which bolts extend axially into the tubular arms 22 and 23 and through holes in shouldered washers 28 which are fitted in the outer ends of said arms and close the same. Nuts 29 are applied to the threaded outer ends of the bolts 27 and impinge against the washers 28 as basis of resistance. Obviously by tightening the nuts 29 on the bolts 27 the legs 26 may be drawn laterally against the arms 22 and 23 both at the top and bottom thereof and thereby rigidly secured to the arms 22 and 23 against endwise or angular movements, see Fig. 15.

Secondary frame

The tilting frame 20 is directly mounted on a secondary frame 30 which, in turn, is carried by the main frame 21 and projects thereabove. This secondary frame 30 is in the form of an inverted U and its legs, at their lower end, are rigidly secured to the arms 22 inward of their legs 26 and with its transverse or horizontal portion parallel to the end members of the frame 21.

The transverse member of the secondary frame 30 is made in two sections, for a purpose that will presently appear, one of which is relatively long and the other of which is relatively short. These long and short sections of the frame 30 overlap, the former above the latter at the right-hand side of said frame, and are rigidly but detachably connected by a splice 31, see Figs. 2 and 4.

The long section of the transverse portion of the secondary frame 30 affords a countershaft 32 about the axis of which the tilting frame 20 may be oscillated. A pair of oblique brace rods 33 directly connect the shaft 32 at its outer ends to the arms 25 and thereby rigidly hold the secondary frame 30 against springing movement longitudinally of the main frame 21. Except for the fact that certain parts, as will hereinafter appear, must be applied to the shaft 32 by axial movement, the U-shaped secondary frame 30 could be made from a single piece of tubing. The advantage of a frame of this type, which is virtually a one-piece construction due to the rigid splice 31, is that its transverse portion, which is curved into the legs, has a great deal more resistance against bending than it would have if it were made of a straight shaft mounted on a pair of legs. In this type of U-shaped frame cross-bracing to hold its transverse portion against longitudinal shifting movement is not necessary.

To permit the parts heretofore referred to, to be applied to the countershaft 32 or removed therefrom, the legs of the secondary frame 30 and the brace rods 33 are detachably secured in position by any suitable means.

*Tilting frame*

The tilting frame 20 includes a pair of laterally spaced tubular guide posts 34, a pair of inner cross-tie plates 35, an outer cross-tie bar 36, and an intermediate cross-tie rod 37. On the inner ends of the guide posts 34 is a splash plate 34' which has at its center a hole through which the drill 17 loosely works. The inner cross-tie plates 35 are applied, the one to the face and the other to the back of the guide posts 34 and rigidly bolted thereto. The outer cross-tie bar 36 is, as shown, made of wood having in its end portions holes through which the guide posts 34 extend. The end portions of the cross-tie bar 36 are slit in the plane of the secondary frame 30 and through the holes for the posts 34 and provided, outward of said posts, with hand-nut-equipped draw bolts 38 by which the prongs of said members may be frictionally clamped onto the posts 34 to rigidly secure the bar 36 thereto in different longitudinal adjustments thereon.

Formed in the cross-tie bar 36, at the longitudinal center thereof, is a hole through which the drill 17 extends with a working fit, or in other words, the cross-tie bar 36 affords an outer bearing for the drill 17. For securing the drill 17 to the tilting frame 20, when not in use or during transportation of the machine, there is provided a hand-piece-equipped set-screw 39 which has screw-threaded engagement with a nut-acting plate 40 secured to the cross-tie bar 36 at the back thereof and which screw is arranged to impinge against the drill 17 and hold the same. As the drill 17 is fed to its work the cross-tie bar 36 may be moved inward on the guide posts 34.

The intermediate cross-tie rod 37, as shown, is a tube rigidly secured by U-bolts 42, intermediate of its ends, in half seats in bearings 41 on the posts 34. These bearings 41 extend rearward from the posts 34 and in turn are rigidly secured to said posts by the U-bolts 42. The cross-tie rod 37 extends materially outward of the bearings 41 at each side of the posts 34.

As previously stated, the tilting frame 20 is mounted to turn about the axis of the countershaft 32 and this is accomplished by bearings 43 and eccentric bushings 44. The bearings extend rearward from the backs of the posts 34, intermediate of their ends, and have half seats in which the eccentric bushings 44 are turnably mounted and held therein by U-bolts 45 which in turn secure the bearings 43 to the posts 34. Normally the U-bolts 45 rigidly hold the eccentric bushings 44 from turning in the bearings 43. The shaft 32 extends through the bushings 44 and which bushings have on their opposing faces hubs 46 through which the shaft 32 also extends concentric thereto. A cross-tie hand bar 47 connects the two hubs 46 and by which said hubs may be turned about the axis of the shaft 32 to rotate the bushings 44 on said shaft. The bushings 44 act as a chain tightener for the power transmission mechanism, as will presently appear, and the arrangement thereof is such as to impart, when turned, a limited endwise movement to the tilting frame 20 transversely of the shaft 32.

A pair of oblique brace rods 48 are provided for rigidly but adjustably holding the tilting frame 20 in either a vertical or horizontal position or at any desired angle between these two extreme positions. These brace rods 48 have on their lower ends open spring eyes 49 through which the arms 25 project. Primarily, the diameter of the eyes 49 is slightly less than the diameter of the arms 25 so that said eyes must be sprung in applying the same to said arms and thereby prevent vibration and resulting wear between the brace rods 48 and the arms 25. While the spring eyes 49 hold the brace rods 48 against longitudinal movement they are free to turn about the axes of the arms 25. Removable headed pins 50 extend through vertical holes in the arms 25 outward of the eyes 49 and hold the eyes 49 against outward axial movement in the arms 25.

The upper end portions of the brace rods 48 are attached to the intermediate cross-tie rod 37 by a single clamp which comprises a link 51 that extends longitudinally and completely through said member with freedom for compound endwise sliding and turning movement. This link 51 has a longitudinal slot 52 through which the brace rods 48 extend outward of the ends of the cross-tie rods 37. A hand-screw 53 has screw-threaded engagement with the right-hand end of the link 51 and impinges against the adjacent brace rod 48 to frictionally press the same against the adjacent end of the cross-tie rod 37 which acts as a base of resistance therefor and causes the screw 53 to impart an endwise movement to the link 51 and thereby frictionally clamp the other brace rod 48 onto the respective end of the cross-tie rod 37. It will thus be seen that by manipulating the single hand-screw 53 the two brace rods 48 are simultaneously frictionally clamped onto the ends of the cross-tie rod 37 or released therefrom.

It is important to note that the tilting frame 20 supports the drill 17 at the transverse center of the main frame 21 and when the tilting frame 20 is in a vertical position its lower end portion overlies the recess 24 with the longitudinal axis of the drill 17 in the same vertical plane with the axes of the arms 22.

Carriage

The carriage 19 comprises an upper crosshead 54, a lower cross-head 55, and a pair of flexible rods 56 which hold said lower cross-head suspended from the upper cross-head 54 for limited universal movement in the plane of said lower cross-head and between the two cross-tie plates 35. The rods 56 extend through aligned holes in the cross-heads 54 and 55 and have nuts applied to their ends outward of said cross-heads. Cushioning springs 57 encircling the rods 56 are compressed between inner nuts on said rods and the under side of the upper cross-head 54. The body of the upper cross-head 54 is made of wood and has holes through which the guide posts 34 extend and said posts hold this cross-head for straight line sliding movement. The upper cross-head 54 is made in two parts which separate longitudinally through the post holes for application to the guide posts 34 by lateral movement toward each other. Metal reinforcing plates 58 are applied to the front and back of the cross-head 54 and connected by bolts which extend through aligned holes in said plates and the sections of the upper cross-head 54 and rigidly connect said sections and plates.

Carriage reciprocating mechanism

The power transmission mechanism for reciprocating the carriage 19 includes a crank-shaft 59 and a pair of connecting rods 60. The crank-shaft 59 extends transversely of the tilting frame 20, directly back of the two cross-tie plates 35, and is journaled in bearings on the guide posts 34.

The two connecting rods 60 at their upper ends are pivoted on trunnions 61 formed with blocks on the ends of the upper cross-head 54 between the plates 58 and are rigidly secured to said plates by bolts, see Fig. 3. Said connecting rods 60 at their lower ends are pivoted on crank-pins 62, one of which is secured to a large crank-acting sprocket wheel 63 on the left-hand end of the crank-shaft 59 and the other of which is on a counter-weighted crank-arm 64 on the right-hand end of said crank-shaft, see Figs. 1 and 2.

It is important to note that the axes of the drill 17, guide posts 34 and trunnions 61 all lie in the same plane and that the connecting rods 60 have a direct pull and push on the cross-head 54 at each side of the guide posts 34.

Motor

The sprocket wheel 63, which forms a part of the power transmission mechanism, is driven from an internal combustion engine, indicated as an entirety by the numeral 65 with the exception of its crank-shaft 66 and fly wheel 67, and is mounted on the main frame 21 with its crank-shaft 66 extending transversely thereof. The base of the engine 65 rests on a pair of laterally spaced timbers 68 which extend longitudinally of the main frame 21 and rest on its end members. Clamping devices 69 rigidly hold the engine base on the timbers 68 and rigidly secure said timbers to the end members of the main frame 21. It is important to note that the weight of the engine 65 is on the rear end portion of the main frame 21 and substantially all of the vibrations thereof are transmitted to the ground through the rear leg 26 so that the drill mechanism is substantially free from engine vibration.

While an internal combustion engine is shown for operating the drill it will, of course, be understood that any suitable motor may be employed.

Transmission mechanism

The transmission mechanism for turning the crank-shaft 66 from the engine 65 includes on the outer face of the fly wheel 67 a relatively small pulley 70 aligned with a relatively large pulley 71 loose on the countershaft 32 and a belt 72 which runs over said two pulleys. Fixed on the inner face of the pulley 71 is a relatively small sprocket wheel 73 aligned with the sprocket wheel 63 and over which sprocket wheels a sprocket chain 74 runs and completes the power transmission mechanism from the engine 65 to the carriage 19 with the exception of a belt tightener for the belt 72.

Belt tightener

The tightener for the belt 72 is a flanged idle pulley 75 on a crank formed with one end of a shaft 76 journaled in a bearing 77 on the frame 30. The crank-shaft 76 is adjustably held, with the idle pulley 75 in engagement with the lower run of the belt 72 to vary the tension thereof, by a hand-lever 78 and a cooperating notched quadrant 79 fixed on the bearing 77.

The hand lever 78 is secured, as indicated at 80 and shown in Figs. 1 and 12, to the outer end of the shaft 76 for rotation therewith but with freedom for pivotal movement longitudinally of said shaft for movement into and out of interlocking engagement with the teeth of the quadrant 79. A coiled spring 81, anchored at one end to the shaft 76 and attached at its other end to an offset part 82 on the hand lever 78, yieldingly holds said lever interlocked with the quadrant 79. This tightener for the belt 72 also serves as a friction clutch for use in starting and stopping the drill-operating mechanism while the engine 65 is running. It also prevents breakage of the mechanism due to the sudden sticking of the drill 17. The hand lever 78, which is conveniently located and easy to operate, provides simple means for starting and stopping the drill-operating mechanism.

Referring again to the eccentric bushings 44, which act as a belt tightener, it is evident that by loosening the U-bolts 45 and turning said bushings on the shaft 32 and in their half seat 43 endwise movement will be imparted to the tilting frame 20, transversely of the countershaft 32, and move the sprocket wheel 73 radially in respect to the sprocket wheel 63 and thereby tension the sprocket chain 74.

Mounting for drill

In addition to the bearing in the cross-tie bar 36 for the outer end portion of the drill 17 said drill has an intermediate or main bearing 83 in the form of a sleeve in which said drill works with freedom for compound endwise and rotary movements. This sleeve bearing 83 is turnably mounted in a pair of half seats 84 in the opposing faces of the two sections of the upper cross-head 54 and the axis of said bearing is parallel to the axes of the guide posts 34. On the ends of the sleeve bearing 83 are annular external flanges 85 which engage the inner and outer faces of the upper cross-head 54 and hold said bearing against axial movement in its half seats 84.

The inner cross-head 55 affords a third or inner bearing for the drill 17 and has, at its center, a hole through which the drill 17 works, see Fig. 3. Said inner cross-head 55 works entirely within the space between the two cross-tie plates 35, is out of contact with said plates, and the guide posts 34 and the flexible rods 56 permit universal shifting movement of the inner cross-head 55 in the plane thereof with the drill 17 so that there is absolutely no side thrusts on the drill 17 where the same works through said cross-head. While the upper and intermediate bearings positively hold the drill 17 for straight line movement the inner bearing or cross-head 55 also serves as a guide for the drill 17 and materially assists in carrying the weight thereof when operating in a horizontal or oblique position.

Means for oscillating main bearing for drill

The bearing sleeve 83 is oscillated about its axis in the half seats 84, during the reciprocatory movement of the carriage 19 to impart steps of rotary movement to the drill 17 during its reciprocatory movement by the carriage 19, by a radially projecting crank-arm 86, integral with the inner flange 85, and a tilting link 87 which connects the outer end of the arm 86 to a fixed bracket 88 on the right-hand guide post 34. The connections between the link 87 and arm 86 and between said link and the bracket 88 are universal joints 89 and 90, respectively, which permit said link to swing in all directions.

Friction grip

A friction grip 91 is applied to the drill 17 at a point between the cross-heads 54 and 55 and through which grip the drill 17 is automatically fed to its work. This friction grip 91 as shown, is a U-shaped spring steel plate, having in the opposing faces of its leaves longitudinally extended half seats which engage the drill 17 at diametrically opposite sides, and a nut-equipped draw bolt 92 which extends through a pair of aligned holes in the leaves of said grip between their outer longitudinal edges and the half seats in said grip. By manipulating the nut on the draw bolt 92 the tension with which the grip 91 engages the drill 17 may be varied, at will. The square end of the draw bolt 92 under its head extends through a square hole in the respective leaf of the grip 91 and holds said bolt from turning therein and a nut-lock 93 holds the nut on said bolt from turning. This nut-lock 93, as shown, is a leaf spring which extends transversely of the grip 91, is secured by a rivet to the respective leaf of the grip 91 near the transverse portion thereof, and has near its free end portion a square hole through which the square inner end of the nut extends, see Fig. 11. Obviously by pressing the spring nut-lock 93 inward the same will be disengaged from the nut and permit said nut to be turned on the bolt 92.

Cooperating with the friction grip 91 is an abutment in the form of a striker plate 94 which rests on the upper edges of the cross-tie plates 35 and is secured to said plates by two pairs of nut-equipped bolts 95 which extend along the outer faces thereof. These bolts 95 extend through aligned holes in the striker plate 94 and outturned flanges 96 on the lower horizontal edges of the plates 35. Short cushioning springs 97, encircling the bolts 95 between their nuts and the plates 35, prevent said nuts from working loose on the bolts 95 under the pounding action of the grip 91 on the striker plate 94.

Propelling and buffer springs

Encircling the drill 17 between the bearing sleeve 83 and the friction grip 91 is a compression propelling spring 98 and a compression buffer spring 99 encircles the drill 17 between said grip and the lower cross-head 55. The spring 98 is secured to the bearing sleeve 83 by having its upper end portion extended through a keeper lug 100 on the crank-arm 86 and the lower end of the buffer spring 99 is similarly secured to the crosshead 55, as indicated at 101. The lower end of the spring 98 is loose for contact with the friction grip 91 and the upper end of the buffer spring 99 is loose for contact with the under side of the grip 91 and works loosely through an aperture in the striker plate 94. It is important to note that when the grip 91 is on the striker plate 94 there is considerable clearance between the grip 91 and the adjacent end of the spring 98, see Fig. 3. The purpose of this clearance will presently appear.

Retaining weights

The front legs 26 are held on the ground during the operation of the drill 17 by a pair of heavy retaining weights 102 which rest on the arms 22 and have vertical holes 103 in which the upper end portions of said legs extend and detachably hold the weights 102 on the arms 22.

Transport truck

A transport truck for the drilling machine includes a pair of tire-equipped wheels 104 journaled on crank-like stub axles 105 adapted to be inserted into the tubular arms 25 and detachably secured thereto by the pins 50 which extend through transverse holes in said axles. In Fig. 5 the wheels 104 are shown in operative positions by means of full lines and in inoperative positions by means of broken lines. By reference to Fig. 16 it will be noted that the stub axle 105 is provided with two holes 90° apart to receive the pin 50 and hold the wheels 104, as shown in either of two positions indicated by full and broken lines in Fig. 5. If necessary the legs 26 may be raised during the transportation of the drilling machine.

Coupling

A coupling 106, as shown in Fig. 5, is secured to the outer end of the drill 17 as a means for attaching the drilling machine to an automobile or other vehicle to be drawn thereby as a trailer. At this time the drill 17, of course, will be rigidly secured to the cross-tie bar 36 by the screw 39.

Setting-up of drilling machine

It may be assumed that the machine has been moved on its transport truck to a quarry or other place where a hole is to be drilled and that the tilting frame 20 is in a horizontal position held by the brace rods 48 and that the drill 17 is locked to said frame by the hand-screw 39, all as shown in Fig. 5. While the drilling machine is being drawn as a trailer by an automobile or other vehicle the coupling 106 holds the same balanced on its wheels with the legs 26 out of contact with the ground.

In setting-up the drilling machine to drill a hole the coupling 106 is removed from the drill 17 and the machine moved on its wheels 104, by hand, to a position in which the transverse center of the recess 24 is over the point where the hole is being drilled and the axes of the arms 22 aligned with said point. When the drilling machine is released, after being moved by hand, it will be supported on the two front legs 26 and the wheels 104. The rear leg 26 is first adjusted onto the ground and if necessary one or both of the front legs 26 adjusted to level up the frame 21. The transport truck is then either removed from the arms 25 or adjusted into an inoperative position, as shown by broken lines in Fig. 5.

Next the hand-screw 53 is operated to release the tilting frame 20 from the brace rods 48 and said frame turned to a vertical position, when a vertical hole is to be drilled, and again rigidly secured to said rods by tightening the hand-screw 53. The friction grip 91 is next released by loosening its draw bolt 92 and the hand-screw 39 operated to release the drill 17 and permit the same to slide by gravity through the bearing in the cross-tie bar 36, the sleeve bearing 83, the bearing in the lower cross-head 55 and the grip 91 to bring the cutting tool 18 onto the rock. If the cutter 18 is not quite at the right point where the hole is to be drilled the machine may be easily shifted to properly position the same. The retaining weights 102 may at this time be placed on the arms 22 with the upper ends of the front legs 26 extending into the holes 103 to hold the weights in place.

The hand lever 78 is next manipulated to move the belt tightener 75 into an inoperative position to release the tension on the belt 72 and permit the pulley 71 to be turned by hand to operate the crank-shaft 59 and position the carriage 19 in its lowermost position. In this position of the carriage 19 the cranks of the shaft 59 are in their lowermost position and the propelling spring 98 and the buffer spring 99 are extended to their full length with the upper end of said buffer spring below the upper face of the striker plate 94. Also at this time the friction grip 91, which is loose on the drill 17, rests on the striker plate 94 and when in this position its draw bolt 92 is tightened to frictionally clamp said grip onto the drill 17 with sufficient pressure to prevent it from slipping thereon under the action of the springs 98 and 99 when under full compression.

It is highly important to note that in this adjustment of the machine there is considerable clearance between the lower end of the propelling spring 98 and the grip 91. It is also important to note, by reference to Fig. 2, that the link 87 is holding the crank-arm 86 with the sleeve bearing 83 oscillated into its extreme left-hand position. By turning the pulley 71 by hand sufficiently to give the crank-shaft 59 a further turn of 180° the carriage 19 will be moved to its uppermost position and the buffer spring 99 projected through the opening in the striker plate 94. This projecting movement of the buffer spring 99 will lift the grip 91 which, in turn, lifts the drill 17 and carries its cutter 18 above the rock. This upward movement of the carriage 19 has also caused the link 87 to rotate the sleeve bearing 83, on the drill 17 and in the upper cross-head 54, into its extreme right-hand position, see Fig. 1.

Finally the engine 65 is started and thereafter the drill 17 is caused to be reciprocated by manipulating the hand lever 78 to move the belt tightener 75 into engagement with the belt 72 and place the same under the desired tension.

Cycle of operation

At the start the carriage 19 is in its lowermost position with the cutting tool 18 resting on the rock, the grip 91 is in engagement with the striker plate 94 and the compression springs 98 and 99 are expanded to their full length. The revolving crank-shaft 59 moves the carriage 19 upward and gives the drill 17 a powerful throw upward through the medium of the buffer spring 99, acting on the grip 91, and the force of this upward throw, which causes the drill 17 to travel at a faster speed than the carriage 19, is caught and absorbed by the propelling spring 98 which is compressed and placed under tension by the action of the grip 91 thereon. The carriage 19 during its downward movement by the crank-shaft 59 gives the drill 17 a powerful downward thrust that is accelerated by the expansion of the compressed propelling spring 98 which causes the drill 17 to attain a high velocity. At or practically at the end of the downward stroke of the drill 17 the grip 91 is brought to a stop by its engagement with the striker plate 94 and as the drill 17 advances into the rock it drives itself through the grip 91 by the force of its momentum. This automatic feeding of the drill 17 through the grip 91 takes place in a series of almost imperceptible steps.

Rotation of the drill

During the upward travel of the carriage 19 the link 87, acting on the crank-arm 86, turns the sleeve bearing 83 to the left without rotating the drill 17 for the reason that the spring 98 is out of engagement with the grip 91 or, in other words, the connection, to wit: the frictional engagement between the propelling spring 98 and grip 91, is broken.

After the carriage 19 has reached the limit of its upward travel the momentum of the drill 17 causes said drill to move in respect to the carriage 19 which brings the grip 91 into contact with the lower end of the propelling spring 98 so that by the time the drill 17 has reached the limit of its upward travel said spring has been compressed to such an extent as to cause sufficient friction between the grip 91 and the inner end of the propelling spring 98 so as to cause the drill 17 to be rotated with the propelling spring 98 as the carriage 19 is travelling downward, as will now appear. Obviously the grip 91 and inner end of the propelling spring 98 afford a small, simple and highly efficient friction clutch.

During the downward travel of the carriage 19 the link 87, acting through the crank-arm 86, turns the sleeve bearing 83 in the cross-head 54 and causes the spring 98 to turn about its axis and by its frictional engagement with the grip 91 turns the same, and hence, imparts a step of rotary movement to the drill 17. It will thus be seen that while the sleeve bearing 83 is given one complete oscillation during each cycle of operation of the drill 17 the action thereof is negative during the upward travel of the carriage 19 and positive during the downward travel of the carriage 19 so that said drill is given steps of rotary movement in a constant direction. The purpose of turning a drill during drilling operation is too well-known to need any comment here.

In addition to the above mentioned frictional contact between the lower end of the propelling spring 98 and the grip 91, for transmitting steps of rotary movement to the drill, there is a frictional contact on the side of the drill 17, caused by the buckling action of the spring 98 when compressed, which materially assists in turning the drill 17 with the propelling spring 98. As the upper end of the propelling spring 98 is positively connected to the sleeve bearing 83, and hence, said spring is positively rotated by said bearing without relying on frictional engagement, it is possible to take advantage of this additional friction to rotate the drill 17. While it is desirable to take advantage of the friction produced by the buckling action of the spring 98 it is not absolutely necessary to the successful working of the machine but it gives a more positive rotation to the drill 17 under difficult conditions such as horizontal drilling.

As previously stated, there is a certain amount of clearance or free play between the grip 91 and inner end of the propelling spring 98, and hence, between the two springs 98 and 99, the object of which is to permit the drill 17 to be thrown upward a similar distance, thus causing the drill 17 to travel a longer stroke than the stroke of the carriage 19. This permits the carriage 19, which travels at a relatively slower velocity than the drill 17 on its downward stroke, to reach the lower limit of its stroke at about the same time that the drill 17 does. If it were not for this the drill 17 would overtake the carriage 19 and the force of its momentum would be absorbed by the lower or buffer spring 99 instead of it being imparted to the drill 17 for cutting away the rock. This timing of the drill 17 with relation to the carriage 19, so that they will reach the downward limit of their strokes at about the same time, can be accurately gauged by the amount of clearance or free play between the grip 91 and compression springs 98 and 99.

As heretofore stated the engine 65 is mounted on the rear end of the frame 21 so that vibrations thereof are transmitted to the ground through the rear leg 26 without affecting the drilling mechanism and the weight of said engine securely holds the rear leg on the ground and the rear end portion of the frame 21 steady.

The secondary frame 30 supports the entire load of the drill and the tilting frame 20 from the frame 21 close to the front legs 26 and in direct line between the axes of said legs, thus relieving the frame 21 from a great deal of the load, as well as shocks and vibrations, which permit the use of a relatively light frame that affords a rigid and firm support for the parts carrying the drill 17.

By turnably mounting the sleeve 83 in the cross-head 54, so that it will turn with the drill 17 during its rotation, and in the novel mounting of the carriage 19 and the application of power thereto for oscillating the same as well as the novel mounting of the drill 17 on the carriage, the drill 17 has very little frictional resistance thus permitting the compound reciprocatory and rotary movements to be free and easy. This mounting of the drill 17 also makes the frictional contact between the grip 91 and propelling spring 98 ample to rotate the drill 17 and hence unnecessary to use a large and heavy clutch as was required in the machine illustrated in the patent heretofore identified, thus relieving the striker plate 94 and in fact, the entire machine from heavy pounding due to the necessary instantaneous stopping of both the clutch and grip which at this time are moving at a high velocity.

The cross-head 54 being of wood and when lubricated freely slides on the guide posts 34 and the sleeve bearing 83 and freely turns therein with little frictional resistance and wear.

What I claim is:

1. In a device of the class described, a frame, a carriage mounted to reciprocate on the frame, a bearing mounted to turn on the carriage, means actuated by the carriage for turning the bearing, a drill mounted to reciprocate endwise in the bearing with freedom for the bearing to turn thereon, a grip frictionally held on the drill, an abutment on the frame with which the grip engages during the operative stroke of the drill to cause the drill to feed independently of the grip, and means co-acting with the bearing and the grip for turning the drill with the bearing.

2. In a device of the class described, a frame, a carriage mounted to reciprocate on the frame, a bearing mounted to oscillate on the carriage, means actuated by the carriage for turning the bearing, a drill mounted to reciprocate endwise in the bearing with freedom for the bearing to turn thereon, a grip frictionally held on the drill, an abutment on the frame with which the grip engages during the operative stroke of the drill to cause the drill to feed independently of the grip, and means co-acting with the bearing and the grip for intermittently turning the drill with the bearing in a constant direction.

3. In a device of the class described, a frame, a carriage mounted to reciprocate on the frame, a bearing mounted to turn on the carriage, means actuated by the carriage for turning the bearing, a drill mounted to reciprocate endwise in the bearing with freedom for the bearing to turn thereon, a grip frictionally held on the drill, an abutment on the frame with which the grip engages during the operative stroke of the drill to cause the drill to feed independently of the grip, and spring means placed under tension between the bearing and grip by the endwise movement of the drill in the bearing during one stroke in each cycle of operation of the drill to connect the grip to the bearing and turn the grip and the drill with the bearing during the other stroke of said cycle.

4. In a device of the class described, a frame, a carriage mounted to reciprocate on the frame, a bearing mounted to turn on the carriage and having a crank-arm, means connecting the crank-arm to the frame whereby the reciprocating carriage will oscillate the bearing therein, a drill mounted to reciprocate endwise in the bearing with freedom for the bearing to turn thereon, a grip frictionally held on the drill, an abutment on the frame with which the grip engages during the operative stroke of the drill to cause the drill to feed independently of the grip, and means co-acting with the bearing and the grip for intermittently turning the drill with the bearing in a constant direction.

5. The structure defined in claim 3 in which the spring means is a coiled spring encircling the drill between the bearing and grip with one of its ends secured to the bearing for movement therewith.

6. The structure defined in claim 3 in which the spring means is a coiled spring encircling the drill between the bearing and grip with one of its ends secured to the bearing for movement therewith, normally there is free play between the spring and the grip.

7. In a device of the class described, a frame, a carriage comprising connected inner and outer cross-heads, the latter of which is mounted to reciprocate on the frame, a drill mounted in bearings on the cross-heads to reciprocate endwise, the inner cross-head being mounted for bodily shifting movement with respect to the outer cross-head to permit a limited movement of the drill therewith in all directions transversely thereof, a grip frictionally held on the drill, and an abutment on the frame with which the grip engages during the operative stroke of the drill to cause the drill to feed independently of the grip.

8. The structure defined in claim 7 which further includes a bearing for the drill on the frame outward of the carriage.

9. In a device of the class described, a frame, a carriage comprising an outer cross-head mounted to reciprocate on the frame, an inner cross-head and flexible means connecting the inner cross-head to the outer cross-head with freedom for a limited bodily movement transversely of the frame, a drill mounted in bearings in the two cross-heads, a grip frictionally held on the drill, and an abutment on the frame with which the grip engages during the operative stroke of the drill to cause the drill to feed independently of the grip.

10. In a device of the class described, a frame including a pair of laterally spaced cross-tie plates on its inner end portion, a carriage comprising an outer cross-head mounted to reciprocate on the frame, an inner cross-head and flexible rods connecting the inner cross-head to the outer cross-head with freedom for a limited bodily movement transversely of the frame, a drill mounted to reciprocate endwise in bearings in the cross-heads, the inner cross-head being between the cross-tie plates with freedom to permit said bodily movement thereof, an abutment on the cross-tie members, and a grip frictionally held on the drill between the outer cross-head and abutment for engagement with the abutment during the operative stroke of the drill to cause the drill to feed independently of the grip.

11. In a device of the class described, a main frame, an inverted U-shaped secondary frame the legs of which are secured to the main frame, the transverse portion of the secondary frame being transversely divided with the members thereof in overlapping arrangement, a clamp rigidly connecting the members of the secondary frame, a tilting frame mounted on the transverse portion of the secondary frame to turn about the axis thereof, and a drill mounted on the tilting frame.

12. In a device of the class described, a main frame, a secondary frame on the main frame, a tilting frame, a pair of axially aligned eccentrics mounted on the secondary frame to turn about a horizontal axis, said tilting frame having a pair of bearings in which the eccentrics are turnably mounted but normally rigidly secured thereto, a carriage mounted to reciprocate on the tilting frame, a drill mounted on the carriage, and means for reciprocating the carriage including a crank-shaft on the tilting frame, connecting rods from the crank-shaft to the carriage and a pair of aligned wheels and a belt arranged to run over the same, one of said wheels being on the crank-shaft and the other of which is on the secondary frame in axial alignment with the eccentrics, said eccentrics when turned in the bearing impart an endwise movement to the tilting frame and act as a tightener for the belt.

13. In a device of the class described, a main frame comprising a pair of side members and front rear cross-tie end members, said side members being extended forwardly of the front end member and then laterally outwardly into axial alignment to afford a pair of arms, a pair of front legs, one on each of the arms, and a rear leg on the rear end member substantially at the transverse center of the main frame, an inverted U-shaped secondary frame, the legs of which are secured to the arms of the main frame, a tilting frame mounted on the secondary frame to turn about the axis of its transverse portion, and oblique brace rods pivoted at their lower ends on the rear end member and adjustably secured at their upper end portions to the tilting frame, a drill mounted on the tilting frame.

14. In a device of the class described, a frame, a reciprocatory carriage mounted on the frame, a drill mounted on the carriage for relatively endwise reciprocatory movement, an abutment rigidly secured to the frame on opposite sides of the drill, a grip frictionally held on the drill outwardly of the abutment for engagement with said abutment at or near the end of the operative stroke of the drill, a buffer compression spring and a propelling compression spring encircling the drill, the former inwardly of the grip and the latter outwardly thereof, the buffer spring and the propelling spring engaging the carriage as a base of resistance and alternately compressed by the grip during reciprocatory movement of the drill with respect to the carriage, and automatic means for turning the drill.

15. In a device of the class described, a frame, a carriage mounted to reciprocate on the frame, a drill mounted to reciprocate endwise on the carriage, an abutment secured to the frame on opposite sides of the drill and intermediate of the ends thereof, a grip frictionally held on the drill outwardly of the abutment for engagement with said abutment at or near the end of the operative stroke of the drill and permitting the drill to feed independently thereof, a buffer compression spring and a propelling compression spring encircling the drill, the former inwardly of the grip and the latter outwardly thereof, the buffer spring and the propelling spring engaging the carriage as a base of resistance and alternately compressed by the carriage grip during reciprocatory movement of the carriage, the buffer spring when compressed being operative on the drill during return movement of the carriage to move the drill at a greater speed than that of the carriage to thereby compress the propelling spring which consequently, during the forward movement of the carriage and operative stroke of the drill, moves the drill at a greater speed than that of the carriage, and in which device the propelling spring is attached to the carriage for reciprocatory movement therewith and there is normally free play between the grip and the propelling spring.

In testimony whereof I affix my signature.

ALBERT HOSSFELD.